(12) United States Patent
Sledzinski et al.

(10) Patent No.: US 11,677,221 B2
(45) Date of Patent: Jun. 13, 2023

(54) LOCKING SNAP-ON SPLICE FOR CABLE BASKET

(71) Applicant: Panduit Corp., Tinley Park, IL (US)

(72) Inventors: Bon B. Sledzinski, Westmont, IL (US); David W. West, Naperville, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/502,695

(22) Filed: Oct. 15, 2021

(65) Prior Publication Data

US 2022/0131352 A1 Apr. 28, 2022

Related U.S. Application Data

(60) Provisional application No. 63/104,138, filed on Oct. 22, 2020.

(51) Int. Cl.
*F16L 3/00* (2006.01)
*H02G 3/04* (2006.01)
*F16B 2/02* (2006.01)

(52) U.S. Cl.
CPC ............. *H02G 3/0406* (2013.01); *F16B 2/02* (2013.01); *H02G 3/0456* (2013.01)

(58) Field of Classification Search
None
See application file for complete search history.

(56) References Cited

U.S. PATENT DOCUMENTS

| | | | |
|---|---|---|---|
| 3,448,955 A | 6/1969 | Fussell | |
| 4,140,417 A | 2/1979 | Danielsen et al. | |
| 5,384,937 A | 1/1995 | Simon | |
| 6,061,884 A | * 5/2000 | Ohms | H02G 3/0443 24/703.1 |
| 6,193,434 B1 | 2/2001 | Durin et al. | |
| 6,402,418 B1 | 6/2002 | Durin et al. | |
| 6,590,154 B1 | * 7/2003 | Badey | H02G 3/0443 174/480 |

(Continued)

FOREIGN PATENT DOCUMENTS

| | | |
|---|---|---|
| AT | 329133 B | 4/1976 |
| DE | 2036325 A1 | 1/1972 |

(Continued)

OTHER PUBLICATIONS

"Abtech Safety", Dec. 31, 2018, pp. 1-52, XP055892027, Retrieved from the Internet: URL:https://www.ppestores.com/files/ww/download/Abtech_brochure_2018_download.pdf [retrieved on Feb. 15, 2022].

*Primary Examiner* — Steven M Marsh
(74) *Attorney, Agent, or Firm* — Christopher S. Clancy; James H. Williams; Aimee E. McVady

(57) ABSTRACT

A bracket secured to adjacent cable baskets to form a cable routing pathway. The bracket includes a splice and a locking latch slidingly secured to the splice. The splice has a base with a top, a bottom, a first end, and a second end. The first end member extends from the first end of the base and a second end member extends from the second end of the base. The first end member and the second end member each include a vertical slot. The locking latch extends through the vertical slot of the first end member and the vertical slot of the second end member to secure the splice to the adjacent cable baskets.

20 Claims, 7 Drawing Sheets

(56) References Cited

U.S. PATENT DOCUMENTS

| | | | |
|---|---|---|---|
| 7,452,157 B2 | 11/2008 | Deciry | |
| 7,468,491 B2 * | 12/2008 | Deciry | H02G 3/0608 |
| | | | 174/480 |
| 7,544,895 B2 | 6/2009 | Penichon | |
| 7,608,786 B2 | 10/2009 | Deciry et al. | |
| 9,853,428 B2 | 12/2017 | Brouwer et al. | |
| 2005/0063775 A1 | 3/2005 | Boltz | |
| 2009/0116902 A1 * | 5/2009 | Quertelet | H02G 3/0608 |
| | | | 403/376 |
| 2009/0266962 A1 * | 10/2009 | Drane | H02G 3/263 |
| | | | 248/314 |
| 2010/0260463 A1 | 10/2010 | Pollard, Jr. et al. | |
| 2014/0224515 A1 * | 8/2014 | Rouleau | H02G 3/0608 |
| | | | 29/428 |
| 2015/0078809 A1 * | 3/2015 | Winn | H02G 3/0443 |
| | | | 403/188 |
| 2022/0337043 A1 * | 10/2022 | Wilson | H02G 3/34 |

FOREIGN PATENT DOCUMENTS

| | | |
|---|---|---|
| DE | 7921266 U1 | 1/1981 |
| DE | 2930083 A1 | 2/1981 |
| EP | 0418167 B1 | 3/1991 |
| EP | 1195870 B1 | 3/2003 |
| EP | 1315261 B1 | 5/2003 |
| EP | 1727252 A1 | 11/2006 |
| EP | 1793464 A1 | 6/2007 |
| EP | 2346129 A2 | 7/2011 |
| ES | 2122829 A1 | 12/1998 |
| ES | 2239882 A1 | 10/2005 |
| ES | 2335183 B2 | 3/2010 |
| ES | 2413554 A1 | 7/2013 |
| FR | 2652142 A1 | 3/1991 |
| FR | 2698416 A1 | 5/1994 |
| GB | 2458750 B | 10/2009 |
| NL | 2002610 C | 8/2013 |
| TW | 201135033 A | 10/2011 |
| WO | 2005090845 A1 | 9/2005 |

\* cited by examiner

LOCKING SNAP-ON SPLICE FOR CABLE BASKET

CROSS REFERENCE TO RELATED APPLICATION(S)

This application claims benefit to U.S. Provisional Patent Application No. 63/104,138, filed on Oct. 22, 2020, the entirety of which is hereby incorporated by reference herein.

FIELD OF THE INVENTION

The present invention relates to a splice for a cable basket, and more particularly to locking snap-on splice for a cable basket.

BACKGROUND OF THE INVENTION

Wire baskets, cable baskets, wire ducts, or wire grids provide a pathway for routing cables in data centers, factories, and warehouses. The wire baskets, cable baskets, wire ducts, or wire grids are provided in sections of varying length and width. Each section is joined to an adjacent section to form a pathway to route the cables. Brackets have been provided to connect adjacent sections. The brackets are secured to the side walls or the bottoms of adjacent cable basket sections. Often one part of the bracket is positioned outside of the pathway and one part of the bracket is positioned inside the pathway. The bracket parts are secured to each other and the cable baskets by fasteners, such as bolts. Snap-on brackets have also been used to secure adjacent cable basket sections to each other. The snap-on bracket may include wrap around arms or clips. The snap-on brackets can be difficult to attach and may not fully secure the cable baskets to each other.

It would be desirable to provide a locking snap-on bracket for adjacent cable baskets that is easily installed and secured on the cable baskets thereby securing adjacent cable baskets to each other.

SUMMARY OF THE INVENTION

The present invention is directed to a bracket for joining adjacent cable baskets. The bracket includes a splice and a locking latch. The splice has a base with a top, a bottom, a first end and a second end. A first end member extends from a first end of the base and a second end member extends from a second end of the base. The first end member and the second end member each include a vertical slot. The locking latch extends through the vertical slots of the first end member and the second end member to secure the splice on the adjacent cable baskets.

DETAILED DESCRIPTION

Figure 1:
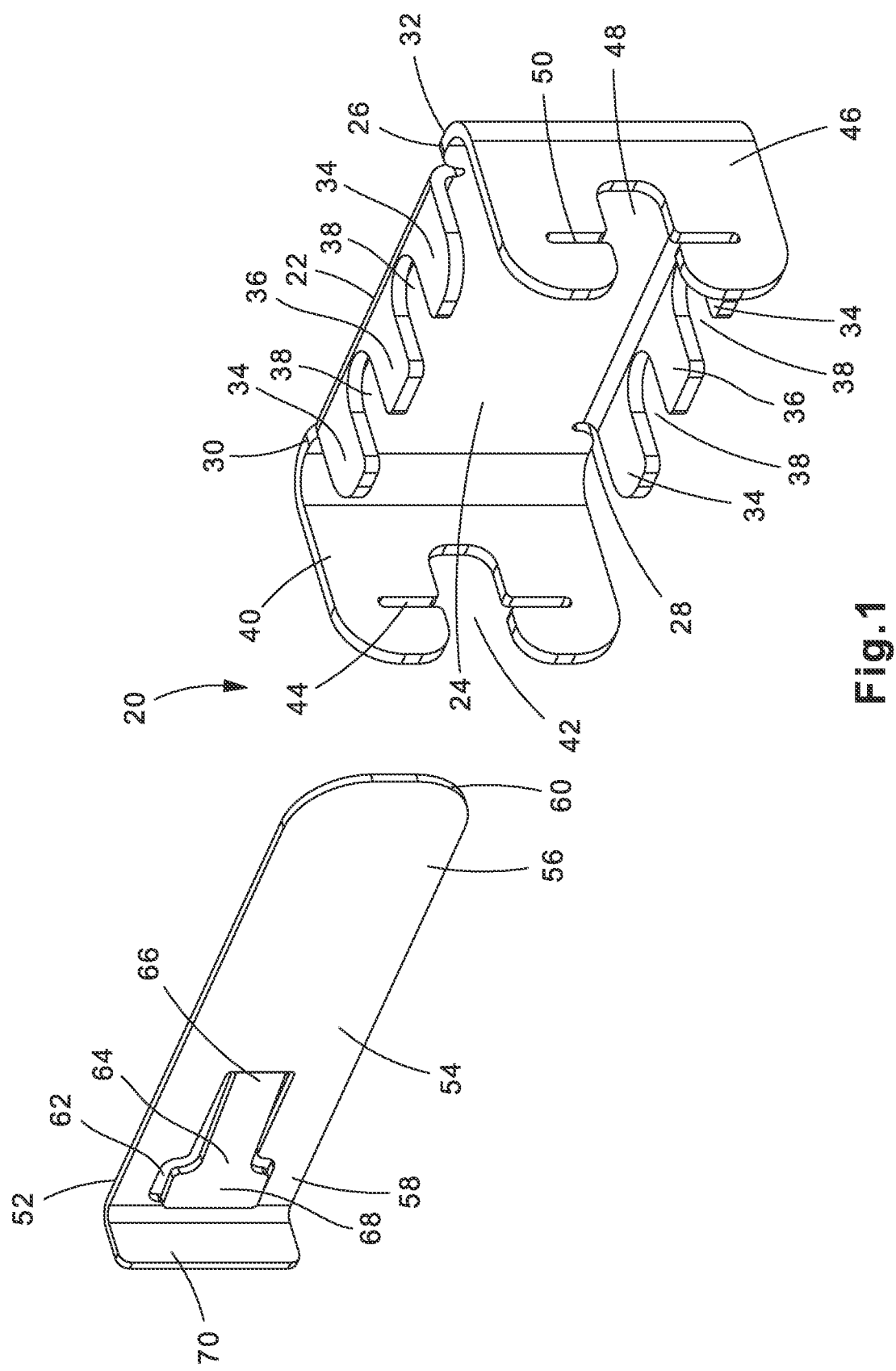
FIG. 1 is an exploded perspective view of the splice and locking latch of the present invention.
Figure 2:
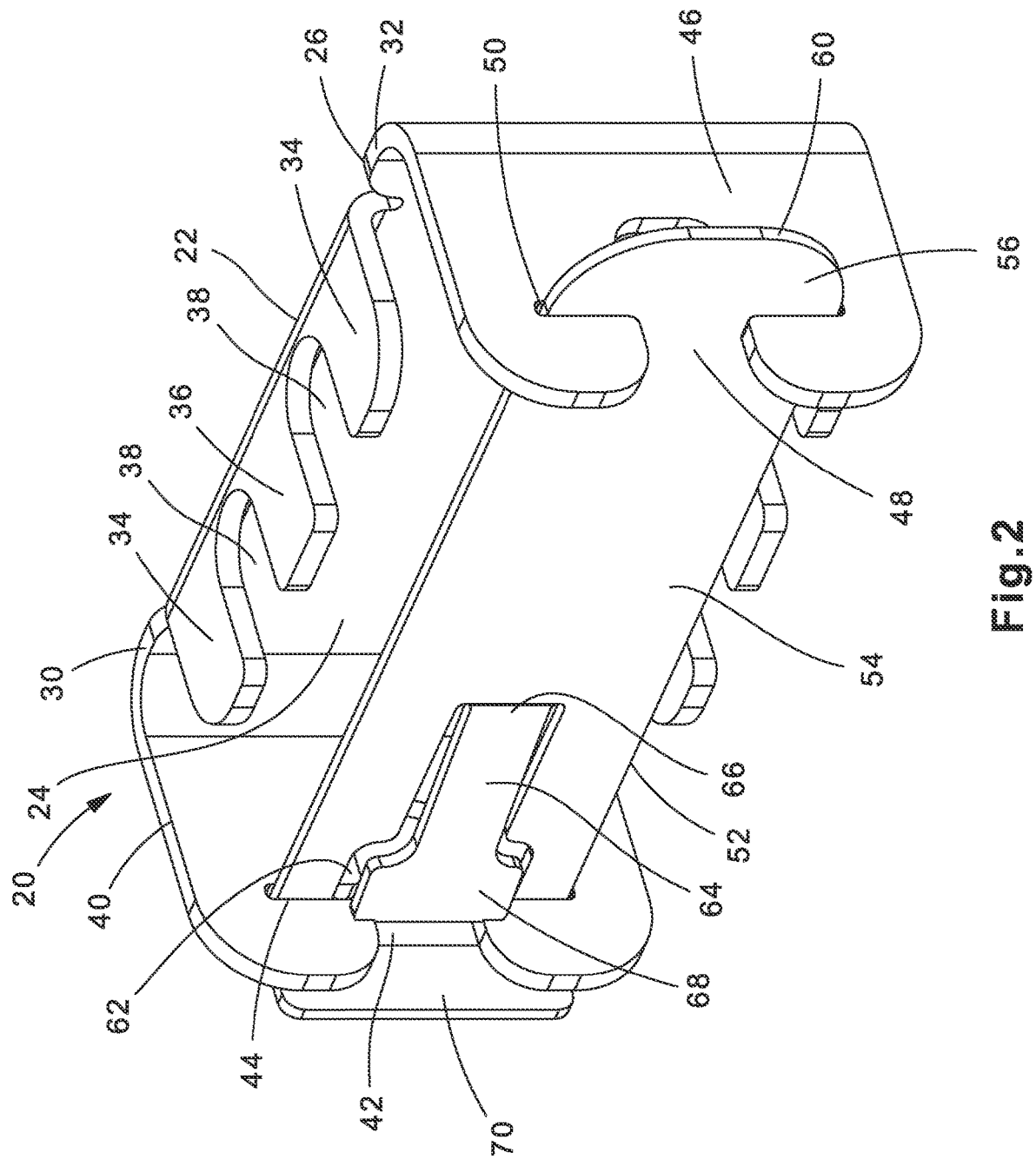
FIG. 2 is a perspective view of the assembled splice and locking latch of FIG. 1.

FIGS. 1 and 2 illustrate the locking snap-on splice or bracket 20 of the present invention. The locking snap-on splice 20 includes a splice 22 and a locking latch 52. The splice 22 includes a base 24 with a top 26, a bottom 28, a first end 30, and a second end 32. Fingers extend from the distal edge of the top 26 and bottom 28 of the base 24. The fingers include holding fingers 34 and a spacing finger 36 positioned in between the holding fingers 34. A wire opening 38 is located between each of the fingers 34, 36. The spacing fingers 36 set the spacing between the transverse wires 84a, 84b of two adjacent cable baskets 80a, 80b (see FIG. 3). End members 40, 46 extend from the first and second ends 30, 32 of the base 24, respectively. Each end member 40, 46 includes a horizontal wire opening 42, 48 positioned at the center of the end member 40, 46, respectively. A vertical slot 44, 50 extends in each end member 40, 46 through the wire opening 42, 48, respectively.

The locking latch 52 includes a main body 54 with a first end 56 and second end 58. The first end 56 of the main body 54 has rounded edges to help facilitate guiding the locking latch 52 into the vertical slots 44, 50 in the end members 40, 46 of the splice 22. An end tab 70 extends generally perpendicularly from the second end 58 of the main body 54.

The locking latch 52 also includes a T-shaped locking tab 64. Although a T-shaped locking tab is illustrated, the locking tab may be formed from other shapes, such as a rectangular shape. The T-shaped locking tab 64 is formed as a cut-out member from the locking latch 52 with one end 66 integral with the main body 54 and the opposite end forming a T-shaped head 68. The T-shaped head 68 is positioned near the second end 58 of the locking latch 54. Thus, the T-shaped locking tab 64 forms an opening 62 in the locking latch 52. The T-shaped locking tab 64 deflects within the opening 62 with respect to the remainder of the locking latch 52. As described below, the locking latch 52 is slid through the vertical slots 44, 50 in the ends 40, 46, respectively, of the splice 22 to secure the splice 22 to adjacent cable baskets 80a, 80b.

Figure 3:
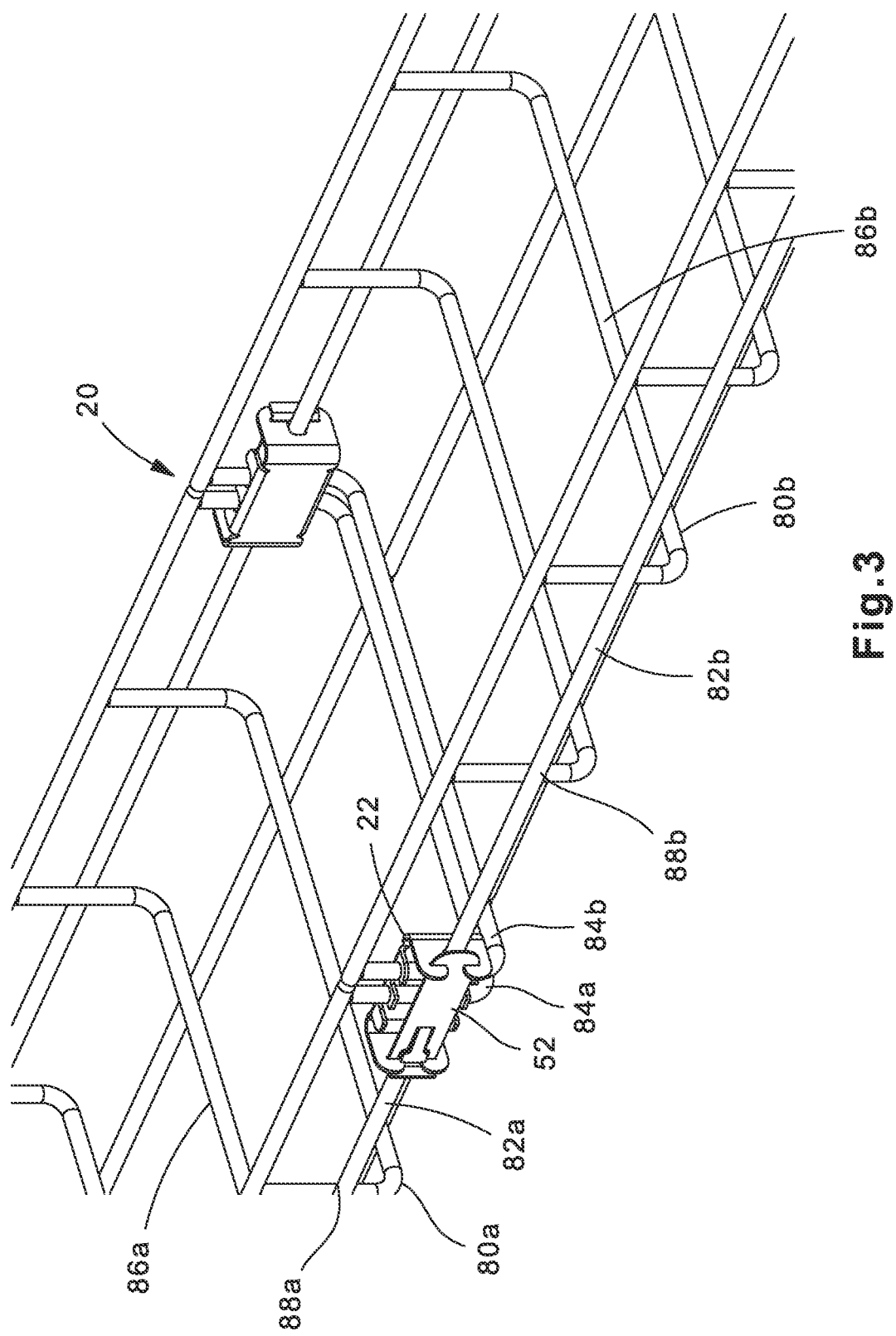
FIG. 3 is a perspective view of adjacent cable baskets secured to each other by the splice and locking latch of FIG. 1.
Figure 4:
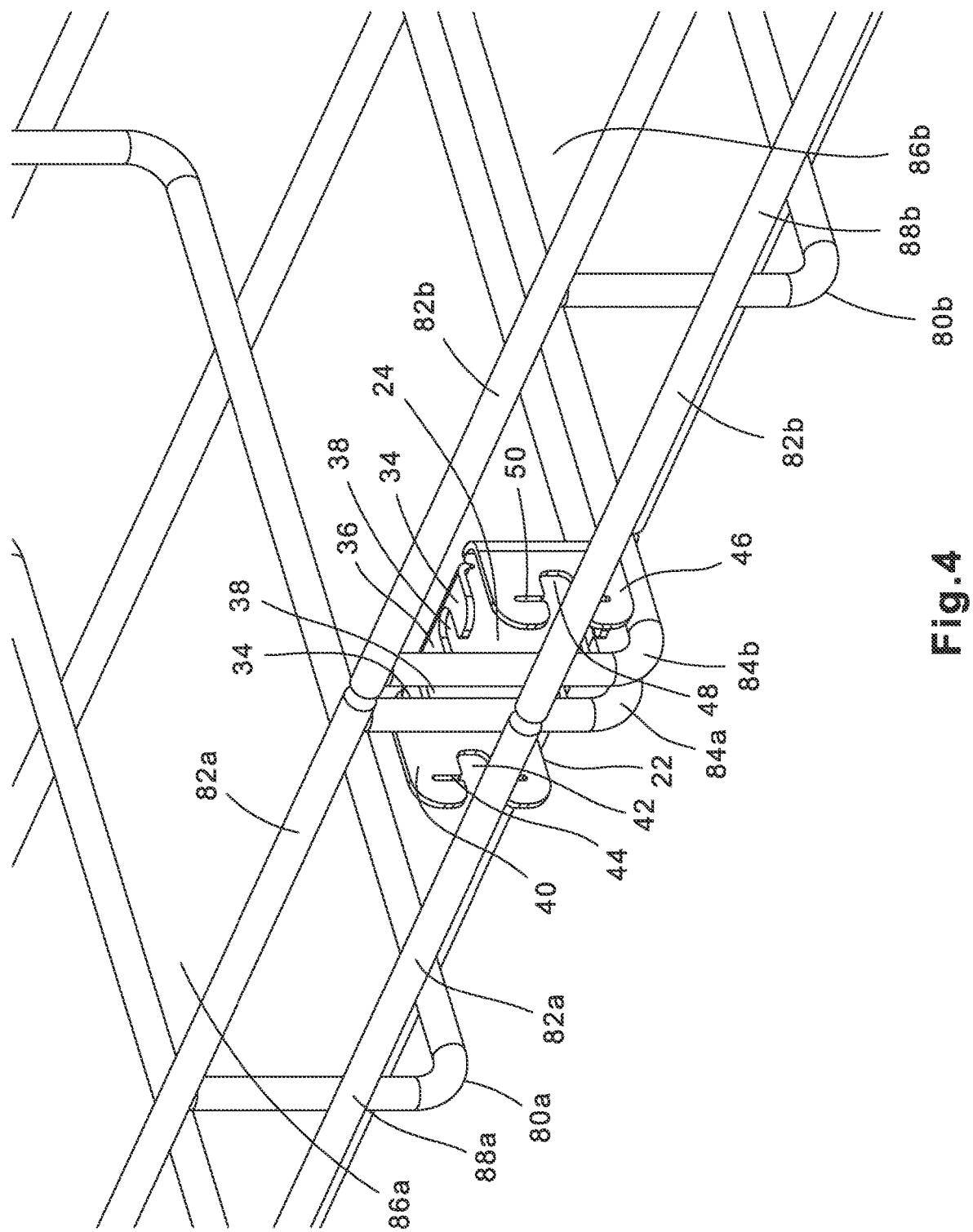
FIG. 4 is a perspective view of the splice of FIG. 1 being installed on the sidewalls of adjacent cable baskets.

Cable baskets 80a, 80b are typically formed from a plurality of longitudinal wires 82a, 82b and a plurality of transverse wires 84a, 84b that define a bottom 86a, 86b with two sidewalls 88a, 88b. The cable baskets 80a, 80b are arranged to form a cable routing pathway with one cable basket 80a positioned adjacent to a second cable basket 80b. FIG. 3 illustrates the locking snap-on splice 20 installed on the sidewalls 88a, 88b of adjacent cable baskets 80a, 80b. The bottoms 86a, 86b and the sidewalls 88a, 88b of each cable basket 80a, 80b are aligned to form a continuous cable routing pathway. The locking snap-on splice 20 is installed from inside of the cable routing pathway with the base 24 of the splice 22 positioned in the cable routing pathway and the fingers 34, 36 extending away from the cable baskets 80a, 80b.

Figure 5:
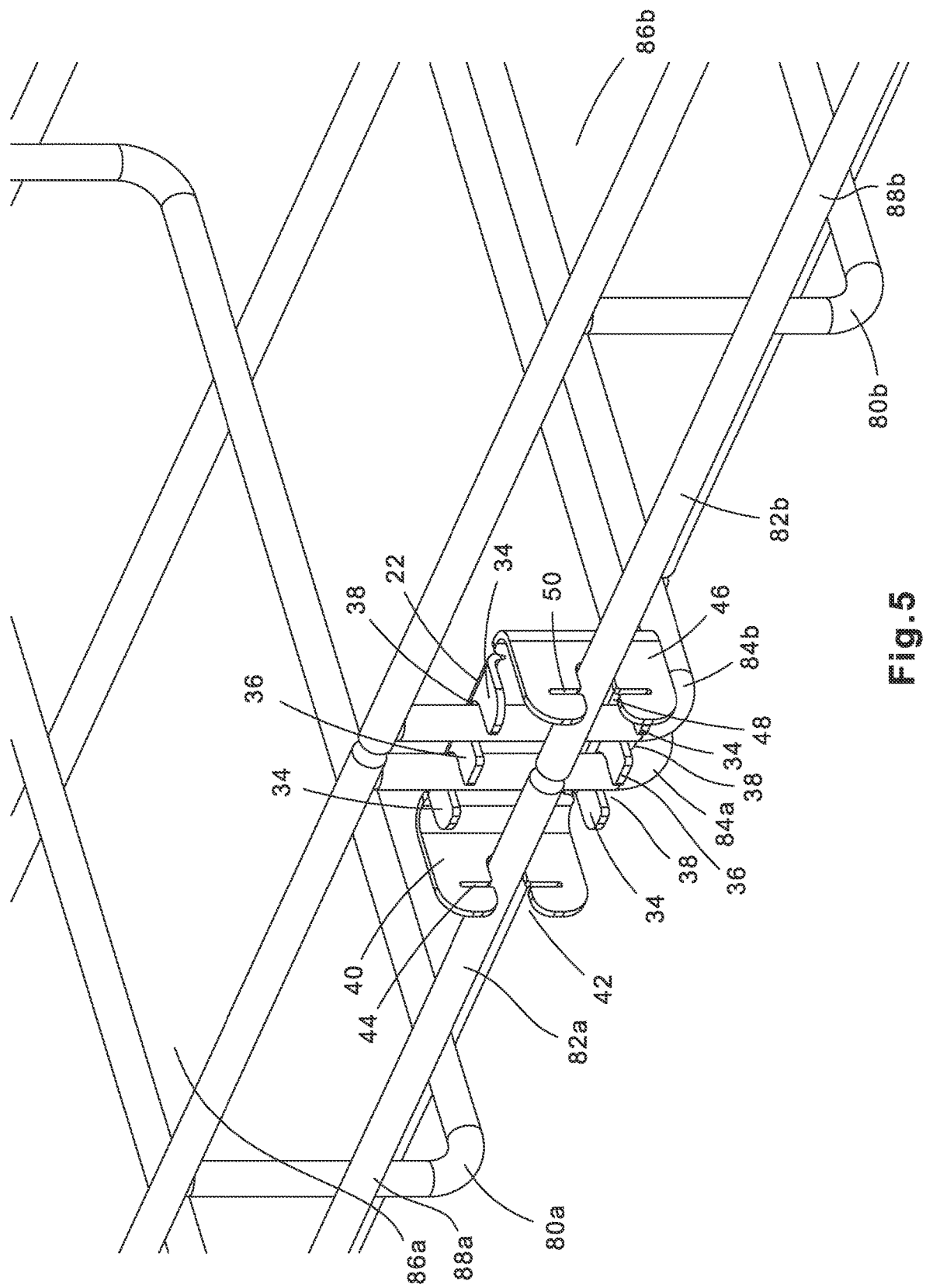
FIG. 5 is a perspective view of the splice of FIG. 1 installed on the sidewalls of adjacent cable baskets.

FIGS. 4-7 illustrate the assembly of the locking snap-on splice 20 as it is installed on the sidewalls 88a, 88b of adjacent cable baskets 80a, 80b. Once adjacent cable baskets 80a, 80b are aligned, the splice 22 of the present invention may be installed. The splice 22 is installed from the inside of the cable routing pathway. The splice 22 is positioned so each wire opening 38 between the holding fingers 34 and the spacing fingers 36 receives one of the transverse wires 84a, 84b of the adjacent cable baskets 80a, 80b. The splice 22 is pushed straight onto the transverse wires 84a, 84b of the adjacent cable baskets 80a, 80b. The horizontal wire openings 42, 48 in the end members 40, 46 receive the lower longitudinal wires 82 of the adjacent sidewalls 88a, 88b. As illustrated in FIG. 5, the left side of the splice 22 engages one cable basket 80a, and the right side of the splice 22 engages an adjacent cable basket 80b. If the cable baskets include additional longitudinal wires that form higher sidewalls, the splice 22 will be positioned on the longitudinal wires that are the second longitudinal wires from the top longitudinal wires of the cable baskets.

Figure 6:
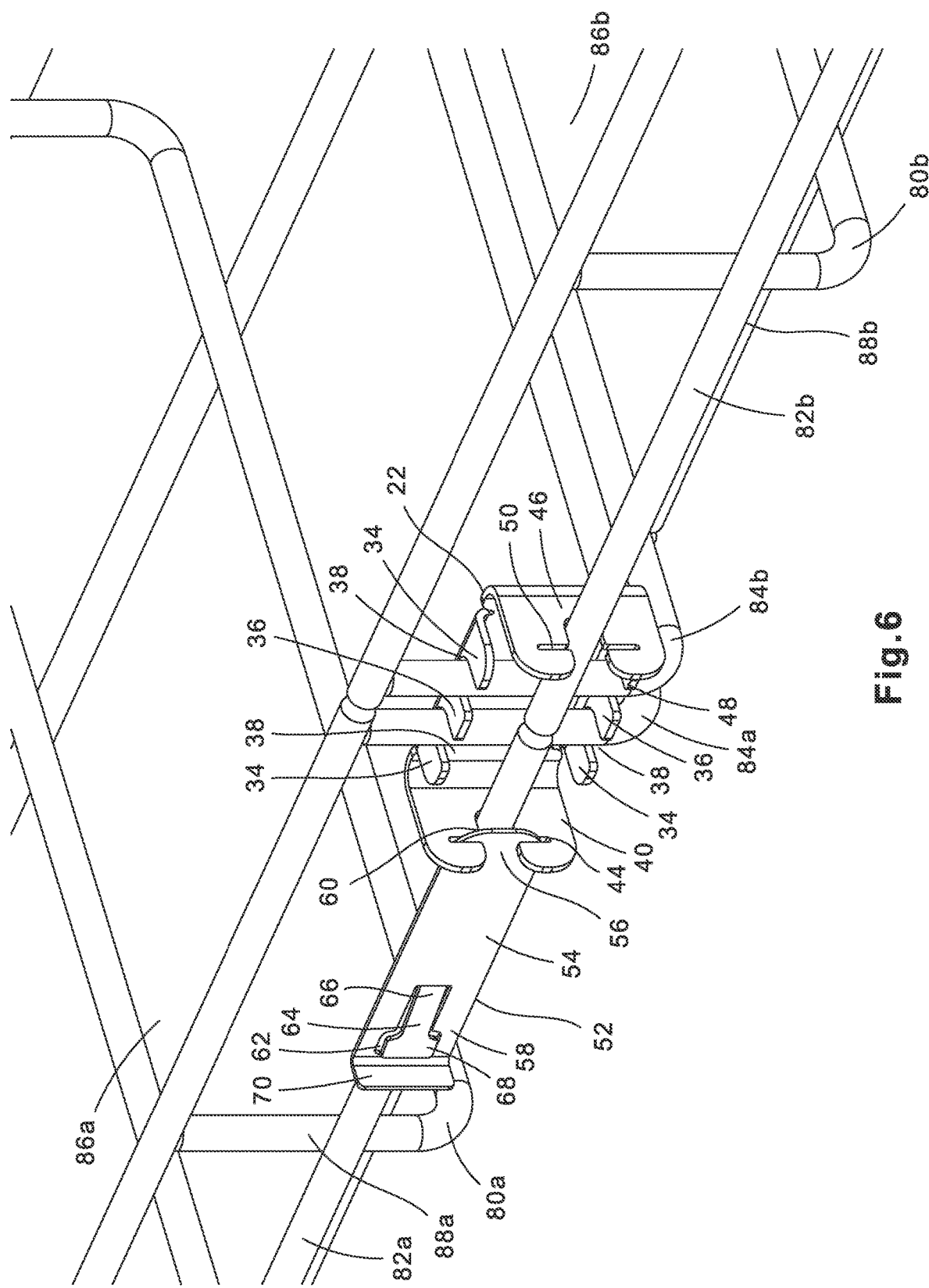
FIG. 6 is a perspective view of the splice of FIG. 5 with the locking latch positioned to be installed in a vertical slot in an end member of the splice.

FIG. 6 illustrates the locking latch 52 being installed in the splice 22. The locking latch 52 is inserted in the vertical slot 44 in the first end member 40 of the splice 22. The user can engage the end tab 70 of the locking latch 52 to push the locking latch 52 to extend across the splice 22 into and through the vertical slot 50 in the second end member 32 of the splice 22. Although the locking latch 52 is installed from the left side of the splice 22 to the right side of the splice 22, the locking latch could be repositioned and installed in the opposite direction from right side to left side of the splice 22, if desired.

Figure 7:
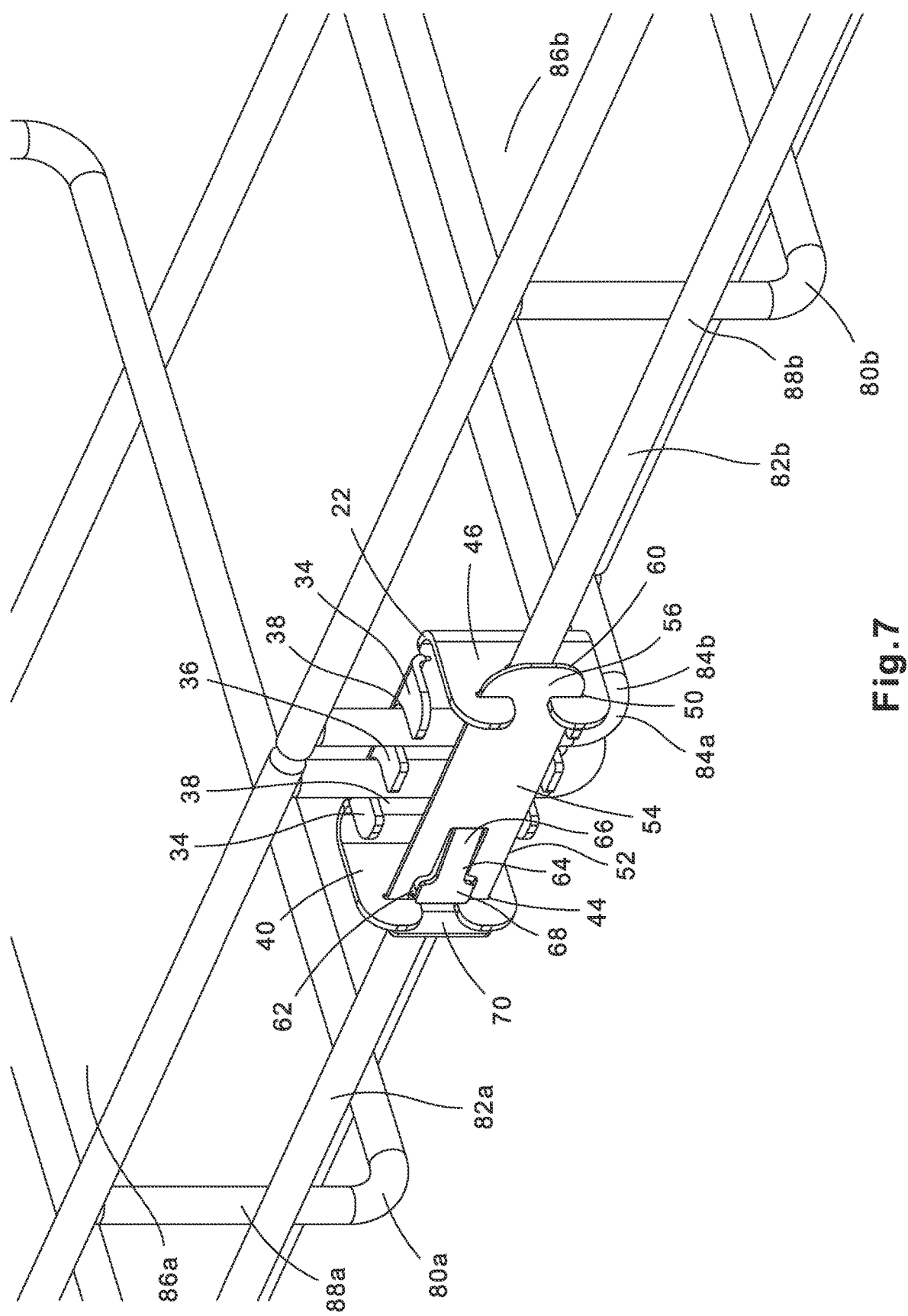
FIG. 7 is a perspective view of the splice of FIG. 6 with the locking latch installed in the vertical slots in the end members of the splice.

FIG. 7 illustrates the locking snap-on splice 20 fully installed on adjacent cable baskets 80a, 80b. The locking tab 64 deflects as it enters the vertical slot 44 in the first end member 40 of the splice 22. Once the locking tab 64 passes through the vertical slot 44, the locking tab 64 springs back into its initial position. The T-shaped head 68 engages the end member 40 and prevents the locking latch 52 from sliding with respect to the vertical slots 44, 50 in the splice 22. As a result, the locking latch 52 and the splice 22 are secured together.

If the locking snap-on splice 20 needs to be removed, the locking tab 64 may be depressed and the end tab 70 pulled to slide the locking latch 52 out of the vertical slots 44, 50 to allow the splice 22 to be removed. The locking snap-on splice 20 may then be repositioned and reinstalled on the cable baskets 80a, 80b, if desired.

If desired, the locking snap-on splice may also be installed on the bottom longitudinal wires of adjacent cable baskets. The additional connection at the bottom longitudinal wires is desirable when joining wider cable baskets.

The splice and the locking latch are both made from a structural material which is elastic and can carry a load. The preferred material would be a spring steel, heat treated to 45 Rockwell C.

The splice and locking latch of the present invention are easy to install on the cable baskets as tools are not required for installation.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A bracket for securing adjacent cable baskets to each other, the bracket comprising:

a splice has a base with a top, a bottom, a first end, and a second end; wherein a first end member extends from the first end of the base and a second end member extends from the second end of the base; wherein the first end member and the second end member each include a vertical slot; and a locking latch slidingly secured to the splice, wherein the locking latch extends through the vertical slot of the first end member and the vertical slot of the second end member to secure the splice to adjacent cable baskets.

2. The bracket of claim 1, wherein the locking latch has a main body with a first end and a second end, the first end has rounded edges for guiding the locking latch through the vertical slots; and wherein an end tab extends perpendicularly from the second end of the main body.

3. The bracket of claim 1, wherein the locking latch has a locking tab, wherein the locking tab is a cut-out member forming an opening in the locking latch; whereby the locking tab deflects within the opening with respect to the locking latch.

4. The bracket of claim 3, wherein the locking tab has a first end integral with the main body of the locking latch.

5. The bracket of claim 4, wherein the locking tab has a second end forming a T-shaped head.

6. The bracket of claim 3, wherein the locking tab is T-shaped.

7. The bracket of claim 1, wherein fingers extend from a distal edge of the top of the base of the splice and a distal edge of the bottom of the base of the splice.

8. The bracket of claim 7, wherein the fingers include holding fingers, a spacing finger positioned between the holding fingers, and wire openings located between the holding fingers and the spacing finger.

9. The bracket of claim 1, wherein each end member has a horizontal wire opening positioned at a center of the end member for receiving a longitudinal wire of a cable basket.

10. The bracket of claim 9, wherein the vertical slot in each end member extends through the horizontal wire opening for enabling the locking latch to be positioned to secure the longitudinal wire of the cable basket.

11. A cable routing pathway comprising:

a first cable basket, wherein the first cable basket has a plurality of longitudinal wires and a plurality of transverse wires that define a bottom and two sidewalls;

a second cable basket positioned adjacent to the first cable basket, wherein the second cable basket has a plurality of longitudinal wires and a plurality of transverse wires that define a bottom and two sidewalls;

wherein the bottom of the first cable basket and the bottom of the second cable basket are aligned, and the sidewalls of the first cable basket and the sidewalls of the second cable basket are aligned to form a continuous cable routing pathway; and a bracket securing the first cable basket to the second cable basket, wherein the bracket has a splice and a locking latch slidingly secured to the splice; wherein the splice is installed on the sidewalls of the adjacent first cable basket and the second cable basket.

12. The cable routing pathway of claim 11, wherein the splice has a base with a top, a bottom, a first end, and a second end; wherein a first end member extends from first end of the base and a second end member extends from the second end of the base; wherein the first end member and the second end member each include a vertical slot; and wherein the locking latch extends through the vertical slot of the first end member and the vertical slot of the second end member to secure the splice to the adjacent cable baskets.

13. The cable routing pathway of claim 12, wherein the locking latch has a main body with a first end and a second end, the first end has rounded edges for guiding the locking latch through the vertical slots; and wherein an end tab extends perpendicularly from the second end of the main body.

14. The cable routing pathway of claim 12, wherein the locking latch has a locking tab, wherein the locking tab is a cut-out member forming an opening in the locking latch; whereby the locking tab deflects within the opening with respect to the locking latch.

15. The cable routing pathway of claim 14, wherein the locking tab has a first end integral with the main body of the locking latch and has a second end forming a T-shaped head.

16. The cable routing pathway of claim 12, wherein fingers extend from a distal edge of the top of the base of the splice and a distal edge of the bottom of the base of the splice.

17. The cable routing pathway of claim 16, wherein the splice is installed from an inside of the cable routing pathway with the base of the splice positioned in the cable routing pathway and the fingers extending away from the cable baskets.

18. The cable routing pathway of claim 16, wherein the fingers include holding fingers, a spacing finger positioned between the holding fingers, and a wire opening located between the holding fingers and the spacing finger.

19. The cable routing pathway of claim 12, wherein each end member has a horizontal wire opening positioned at a center of the end member for receiving the longitudinal wire of one of the first and second cable baskets.

20. The cable routing pathway of claim 19, wherein the vertical slot in each end member extends through the horizontal wire opening for enabling the locking latch to be positioned to secure the longitudinal wires of the cable baskets.

* * * * *